US008638341B2

(12) United States Patent
Kallio (10) Patent No.: US 8,638,341 B2
(45) Date of Patent: Jan. 28, 2014

(54) ANTIALIASING OF TWO-DIMENSIONAL VECTOR IMAGES

(75) Inventor: Kiia K. Kallio, Inkoo (FI)

(73) Assignee: QUALCOMM Incorporated, San Diego, CA (US)

( * ) Notice: Subject to any disclaimer, the term of this patent is extended or adjusted under 35 U.S.C. 154(b) by 978 days.

(21) Appl. No.: 11/876,870

(22) Filed: Oct. 23, 2007

(65) Prior Publication Data

US 2009/0102857 A1    Apr. 23, 2009

(51) Int. Cl.
*G09G 5/00* (2006.01)
*G06T 15/50* (2011.01)
*G06T 15/60* (2006.01)
*G09G 5/02* (2006.01)

(52) U.S. Cl.
USPC ............ 345/611; 345/426; 345/592; 345/613

(58) Field of Classification Search
USPC .................................. 345/611, 426, 592, 613
See application file for complete search history.

(56) References Cited

U.S. PATENT DOCUMENTS

| | | | | |
|---|---|---|---|---|
| 5,515,484 A | * | 5/1996 | Sfarti et al. | 345/424 |
| 5,684,939 A | * | 11/1997 | Foran et al. | 345/612 |
| 5,754,185 A | * | 5/1998 | Hsiao et al. | 345/592 |
| 5,850,232 A | * | 12/1998 | Engstrom et al. | 345/539 |
| 5,886,701 A | * | 3/1999 | Chauvin et al. | 345/418 |
| 5,963,201 A | * | 10/1999 | McGreggor et al. | 715/722 |
| 6,028,583 A | * | 2/2000 | Hamburg | 345/629 |
| 6,091,425 A | * | 7/2000 | Law | 345/619 |
| 6,100,899 A | * | 8/2000 | Ameline et al. | 345/605 |
| 6,115,049 A | * | 9/2000 | Winner et al. | 345/611 |
| 6,130,676 A | * | 10/2000 | Wise et al. | 345/619 |
| 6,147,690 A | * | 11/2000 | Cosman | 345/592 |
| 6,204,859 B1 | * | 3/2001 | Jouppi et al. | 345/592 |
| 6,288,730 B1 | * | 9/2001 | Duluk et al. | 345/552 |
| 6,289,364 B1 | * | 9/2001 | Borg et al. | 715/209 |
| 6,412,061 B1 | * | 6/2002 | Dye | 712/32 |
| 6,614,444 B1 | * | 9/2003 | Duluk et al. | 345/581 |
| 6,614,447 B1 | * | 9/2003 | Bhatia et al. | 345/592 |
| 6,614,449 B1 | * | 9/2003 | Morein | 345/611 |
| 6,664,958 B1 | * | 12/2003 | Leather et al. | 345/422 |
| 6,903,738 B2 | * | 6/2005 | Pfister et al. | 345/420 |

(Continued)

OTHER PUBLICATIONS

L. Carpenter, "The A-Buffer, An Antialiased Hidden Surface Method", in SIGGRAPH '84: Proceedings of the 11th Annual Conference on Computer Graphics and Interactive Techniques, New York, NY, USA, 1984, ACM Press, pp. 103-108.

(Continued)

*Primary Examiner* — David T Welch
(74) *Attorney, Agent, or Firm* — James R. Gambale, Jr.

(57) ABSTRACT

Described is a method of rendering an image. A transparency of a destination pixel and a transparency of a source pixel are determined at multiple sample positions in each pixel. A new pre-multiplied color is determined for the destination pixel in response to the transparencies of the destination pixel, the transparencies of the source pixel, a color of the source pixel and a pre-multiplied color of the destination pixel. New transparencies of the destination pixel are determined at the samples in the destination pixel in response to the transparencies of the source pixels and the transparencies of the destination pixel. The method of the present invention permits rendering of polygonal two-dimensional images while eliminating overdraw, therefore using less memory bandwidth than conventional methods for rendering typical two-dimensional vector images. Thus the method is suited for mobile computing and other applications with limited memory bandwidth.

26 Claims, 8 Drawing Sheets

(56) References Cited

U.S. PATENT DOCUMENTS

| | | | |
|---|---|---|---|
| 6,933,952 B2* | 8/2005 | Frisken et al. | 345/611 |
| 7,102,651 B1* | 9/2006 | Louveaux et al. | 345/629 |
| 7,171,051 B1* | 1/2007 | Moreton et al. | 382/233 |
| 2001/0028352 A1* | 10/2001 | Naegle et al. | 345/501 |
| 2002/0097241 A1* | 7/2002 | McCormack et al. | 345/423 |
| 2002/0130886 A1* | 9/2002 | Baldwin | 345/611 |
| 2002/0149600 A1* | 10/2002 | Van Splunter et al. | 345/592 |
| 2002/0171672 A1* | 11/2002 | Lavelle et al. | 345/630 |
| 2003/0160793 A1* | 8/2003 | Emberling et al. | 345/506 |
| 2003/0189568 A1* | 10/2003 | Alkouh | 345/422 |
| 2004/0012611 A1* | 1/2004 | Taneja et al. | 345/611 |
| 2004/0080512 A1* | 4/2004 | McCormack et al. | 345/543 |
| 2006/0103671 A1* | 5/2006 | Brown | 345/629 |
| 2006/0192788 A1* | 8/2006 | Stollnitz | 345/592 |
| 2007/0070082 A1* | 3/2007 | Brennan | 345/592 |
| 2007/0071312 A1* | 3/2007 | Gardella et al. | 382/154 |
| 2007/0103462 A1* | 5/2007 | Miller | 345/421 |
| 2008/0012878 A1* | 1/2008 | Nystad et al. | 345/613 |
| 2008/0094410 A1* | 4/2008 | Jiao et al. | 345/592 |
| 2008/0094411 A1* | 4/2008 | Parenteau et al. | 345/592 |
| 2008/0284780 A1* | 11/2008 | Hsu | 345/422 |

OTHER PUBLICATIONS

E. Catmull, "A Hidden-Surface Algorithm with Anti-Aliasing", In SIGGRAPH '78: Proceedings of the 5th Annual Conference on Computer Graphics and Interactive Techniques, New York, NY, USA, 1978, ACM Press, pp. 6-11.

Daniel Rice, "OpenVG Specification", Version 1.0.1, The Khronos Group Inc., Jan. 26, 2007.

Peter Shirley, "Discrepancy as a Quality Measure for Sample Distributions", Proceedings of Eurographics 91, Jun. 1991, pp. 183-193.

* cited by examiner

PRIOR ART

ANTIALIASING OF TWO-DIMENSIONAL VECTOR IMAGES

FIELD OF THE INVENTION

The invention relates generally to graphics processing. More particularly, the invention relates to a method and system for performing antialiasing of two-dimensional vector images.

BACKGROUND

Antialiasing in two-dimensional (2D) images consisting of general polygons typically involves calculating the coverage of each pixel affected by a polygon, converting the coverage value to transparency, and blending the fill color to the image using simple alpha blending. The coverage calculation is performed using multiple samples within each pixel or by arithmetic operations. The composition of the final image is based on the painter's algorithm, i.e., polygons are rendered in back to front order.

Figure 1A:
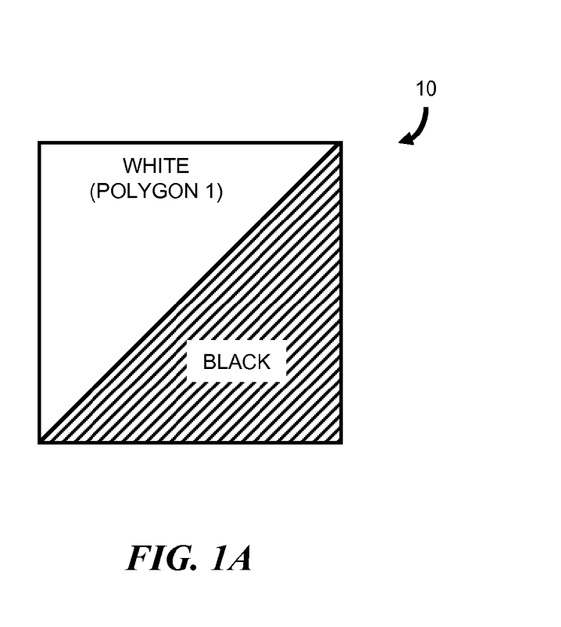
FIG. 1A shows a pixel partially covered by a white polygon and FIG. 1B shows the same pixel covered with an additional, adjacent white polygon.
Figure 1B:
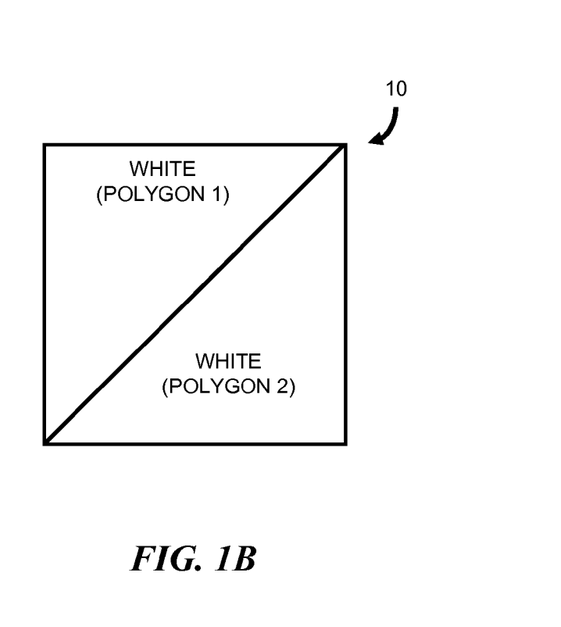

Although the antialiasing of images rendered this way is suitable for most purposes, undesirable artifacts can occur. A typical effect is "color bleeding", where the background color or geometry that should be hidden is apparent through a shared edge of two adjacent polygons. Color bleeding occurs because the antialiasing for the edge is calculated separately for each polygon. For example, if the background color is black and a white polygon (polygon 1) covers 50% of a pixel 10 as shown in FIG. 1A, the color for the pixel 10 is 50% gray (where 100% gray constitutes pure black). If an adjacent white polygon (polygon 2) is added and covers the remainder of the pixel 10 as shown in FIG. 1B, the resulting color is 75% gray instead of the correct color for the pixel 10 which is white. In this example, the coverage calculations are correct; the artifact results from the composition algorithm.

The undesirable effect is avoided when creating the content by layering the shapes on top of each other instead of making the shapes adjacent. This can lead to a large amount of overdraw, requiring significant memory bandwidth. For instance, free-form gradients are often created in content tools by creating a blend between two shapes. In some instances employing the layering technique, a large number of layers are rendered on top of each other with only the nearest of the layers being visible.

Other techniques are used to avoid the occurrence of artifacts. One technique is based on the use of compound shapes. A compound shape is a collection of polygon edges that defines a set of adjacent polygons. A compound shape rasterizer evaluates the total coverage and color of all polygons for each pixel; however, this method cannot be generally applied due the limitations defined for the compound shapes, and specifically prepared data is required where overlap is removed to produce practical results. Moreover, hardware implementation of a compound shape rasterizer is not practical and a temporary buffer for shape composition is required.

Figure 2:
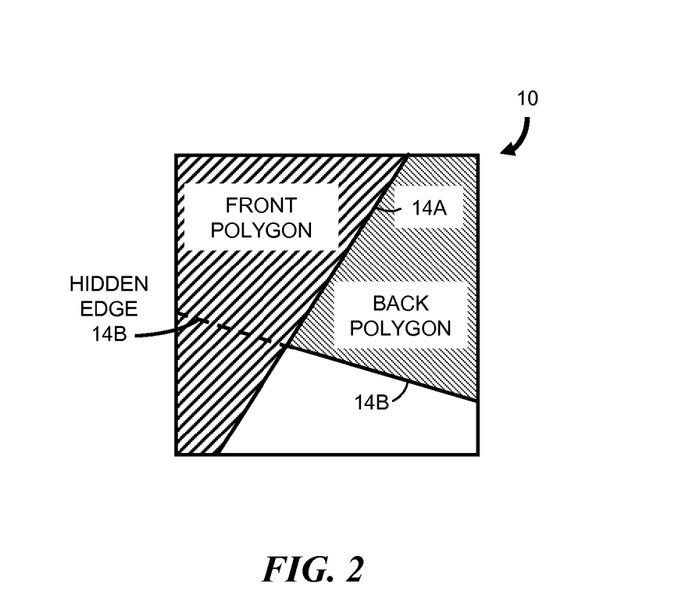
FIG. 2 is shows a pixel partially covered by polygons having overlapping edges.

Another technique uses three-dimensional (3D) graphics hardware and is based on rendering polygons which are sorted from front to back. Although proper antialiasing is achieved for adjacent polygon edges, artifacts are generated for pixels that have overlapping edges 14A and 14B as shown in FIG. 2 because the coverage value does not include information about the spatial arrangement of the covered areas within the pixel 10 as described in more detail below.

SUMMARY OF THE INVENTION

In one aspect, the invention features a method of rendering an image. A transparency of a destination pixel is determined at a plurality of samples in the destination pixel and a transparency of a source pixel is determined at a plurality of samples in the source pixel. The destination pixel is in front of the source pixel. A new pre-multiplied color of the destination pixel is determined in response to the transparencies of the destination pixel, the transparencies of the source pixel, a color of the source pixel and a pre-multiplied color of the destination pixel. In one embodiment, new transparencies of the destination pixel are determined at the samples in the destination pixel in response to the transparencies of the source pixels and the transparencies of the destination pixel.

In another aspect, the invention features a method of rendering an image in which a destination transparency $A_{di}$ is determined at a number n of samples in a destination pixel and a source transparency $A_{si}$ is determined at the number n of samples in a source pixel, where the source pixel is behind the destination pixel. A new pre-multiplied color p for the destination pixel is calculated in response to a pre-multiplied destination color $p_d$, a source color $c_s$, the destination transparencies $A_{di}$ and the source transparencies $A_{si}$ as $$p = p_d + c_s \times \frac{1}{n}\sum_{i=1}^{n}(A_{si} \times (1 - A_{di})).$$

In one embodiment, new transparency values $A_i$ are calculated for the samples in the destination pixel in response to the destination transparencies $A_{di}$ and the source transparencies $A_{si}$ as $A_i = A_{di} + A_{si} \times (1 - A_{di})$ where $i = 1$ to $n$.

In still another aspect, the invention features a graphics processor for generating antialiased two-dimensional vector images. The graphics processor includes a source buffer, a destination buffer and a composition module. The storage buffer stores a color and a plurality of transparencies of each source pixel in a plurality of source pixels. The destination buffer stores a color and a plurality of transparencies for each destination pixel in a plurality of destination pixels. Each transparency is associated with a sample in a respective one of the source pixels or the destination pixels and each destination pixel is in front of a respective one of the source pixels. The composition module is in communication with the destination buffer and the source buffer. A new pre-multiplied color for each destination pixel is generated by the composition module in response to the transparencies of the respective destination pixel, the transparencies of the respective source pixel, a color of the respective source pixel and a pre-multiplied color of the respective destination pixel. The composition module also generates a new transparency for each destination pixel at each sample in the destination pixel in response to the transparencies of the respective source pixel and the transparencies of the respective destination pixel.

In yet another aspect, the invention features a computer readable medium for rendering an image. The computer readable medium includes computer executable instructions to cause a processor to determine a transparency of a destination pixel at a plurality of samples in the destination pixel and to determine a transparency of a source pixel at a plurality of samples in the source pixel, where the destination pixel is in front of the source pixel. The computer executable instructions also cause the processor to determine a new pre-multiplied color of the destination pixel in response to the transparencies of the destination pixel, the transparencies of the source pixel, a color of the source pixel and a pre-multiplied color of the destination pixel.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 3:
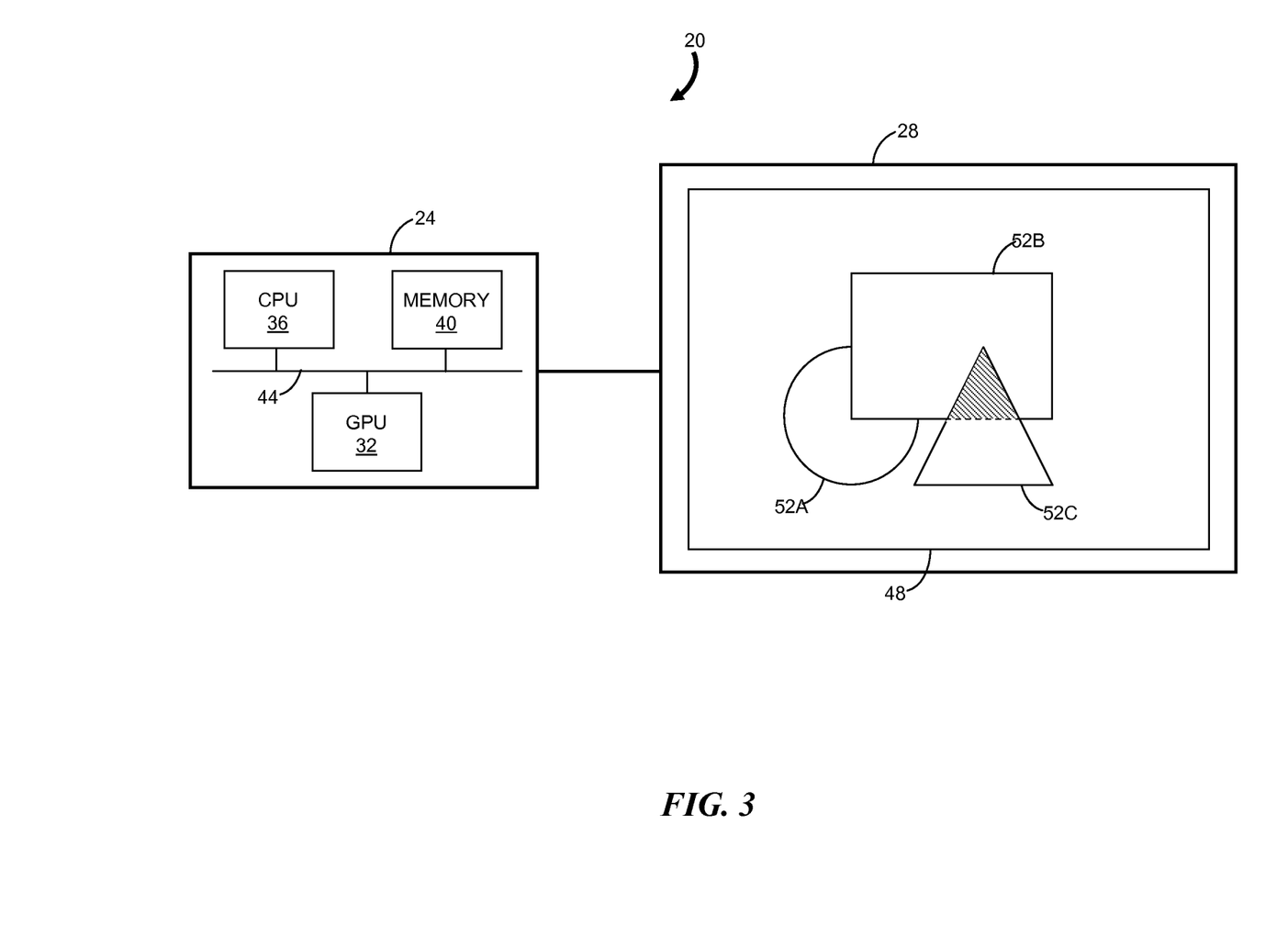
FIG. 3 shows a graphics processing system in which the method of the invention can be practiced.

FIG. 3 shows an embodiment of a graphics processing system 20 including a computing system 24 in communication with a display screen 28. The computing system 24 includes a graphics-processing unit (GPU) 32, a central processing unit (CPU) 36, and memory 40, each connected to a system bus 44. The GPU 32 can include buffers (e.g., source pixel buffer and destination pixel buffer) and functional components, such as a composition module used in image rendering. Various examples of computing systems within which the present invention may be embodied include, but are not limited to, personal computers (PC), Macintosh computers, workstations, laptop computers, mobile phones, personal digital assistants (PDAs), hand-held devices, server systems and game consoles.

The memory 40 includes non-volatile computer storage media, such as read-only memory (ROM), and volatile computer storage media, such as random-access memory (RAM). Within the RAM are program code and data (i.e., graphics information). Program code includes, but is not limited to, application programs, a graphics library, and an operating system (e.g., Symbian OS, Palm OS, Windows Mobile, Windows 95™, Windows 98™, Windows NT 4.0, Windows XP™, Windows 2000™, Vista™, Linux™, SunOS™, and MAC OS™). Examples of application programs include, but are not limited to, standalone and networked video games, simulation programs, word processing programs, and spreadsheet programs.

The display screen 28 can be any device suitable for displaying computer-graphics generated images. Examples of display screens include, but are not limited to, computer monitors, mobile phone displays, PDA displays, television monitors, liquid crystal displays (LCD), and cathode ray tube displays. In the example shown, a two-dimensional (2D) image 48 includes a circle 52A, a rectangle 52B and a triangle 52C (generally shapes 52). The rectangle 52B is opaque and therefore obscures the upper right portion of the circle 52A. The triangle 52C is in front of the rectangle 52B and has a non-zero and non-saturated transparency value. Consequently, the rectangle 52B is visible through the upper (shaded) portion of the triangle and the displayed color for the overlap regions is determined according to the color of the rectangle 52B, and the color and transparency value of the triangle 52C. Accordingly, the image 48 is an example for which portions of the shapes 52 are obscured by or blended with portions of other shapes 52.

In brief overview of operation, the GPU 32 receives graphics commands from the CPU 36 and graphics information from the memory 40 or other graphics information source. Based on the received commands and graphics information, the GPU 32 performs various composition calculations and generates the image 48 for the display screen 28. The method of the present invention permits rendering of polygonal 2D images while eliminating overdraw, therefore using less memory bandwidth than conventional methods for rendering typical 2D vector images. Thus the method is suited for mobile computing and other applications with limited memory bandwidth.

Figure 4:
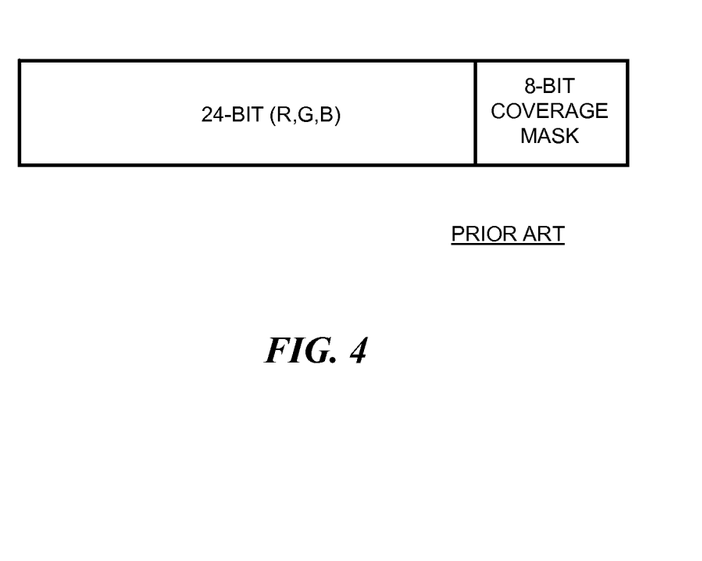
FIG. 4 graphically represents pixel bits having R, G and B components and an 8-bit coverage mask representing eight spatial samples in the pixel as is known in the art.

Conventional graphics processing systems employ various techniques to generate antialiased 2D vector images. One technique referred to above is based on rendering polygons which are sorted from front to back with additive blending. A blend function of one is used for the destination factor and an alpha saturate blend function $(f,f,f,1)$ is used for the source factor, where $f=\min(\alpha_s, 1-\alpha_d)$ and $\alpha_s$ and $\alpha_d$ are the source and destination alpha values, respectively. Proper antialiasing is achieved for adjacent polygon edges; however, artifacts are generated for overlapping polygon edges (see, e.g., FIG. 2) because the coverage value for a pixel does not include information about the spatial arrangement of the covered area within the pixel. The technique is beneficial for 2D images because the rendering order of the polygons is from front to back (i.e., the reverse of the sorting order). The composition calculations are different from those used for normal alpha blending because the bits normally reserved for the alpha value $\alpha$ are used to indicate pixel coverage instead of transparency. To include spatial information, the technique is modified so that an 8-bit coverage mask representing 8 samples in the pixel is used in place of the 8-bit alpha value portion of the pixel data as shown in FIG. 4. The "value" of the mask can be converted to an alpha value to determine the blending factor by counting the asserted bits. Composition is accomplished using binary masking operations. High quality rendering is achieved using appropriate sample distributions because the pixel spatial coverage is accommodated; however, transparency is not directly supported by this technique other than by generating screen door masks as is known in the art.

Figure 5:
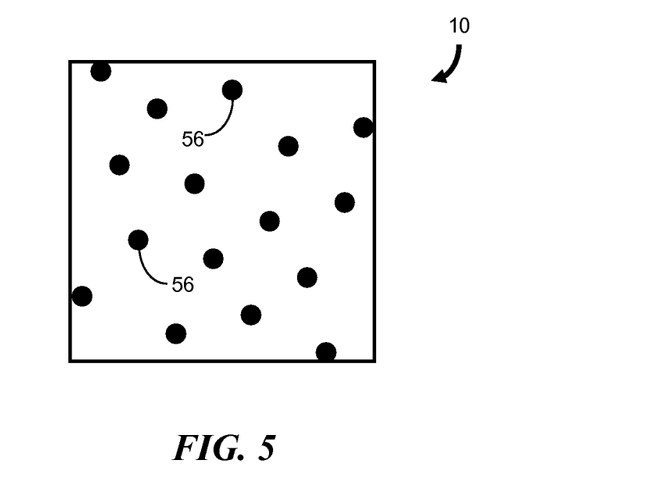
FIG. 5 graphically represents the sample positions associated with transparency values for a pixel 10 based on an n-rooks pattern in accordance with an embodiment of the invention.

The method of the invention overcomes the above-described limitations on transparency. Instead of storing a bit mask value having a number n of bits to define the area covered by the pixel on a buffer, n values are used to represent the transparencies at the n sample positions in the pixel. In one embodiment the number n of transparency values (and sample positions 56) per pixel 10 is 16 as shown in FIG. 5. As illustrated, the distribution of the samples 56 is based on an "n-rooks pattern" where there is only one sample on a vertical or horizontal line, although other sample distributions can also be used. A single color value is stored for the pixel 10.

Figure 6:
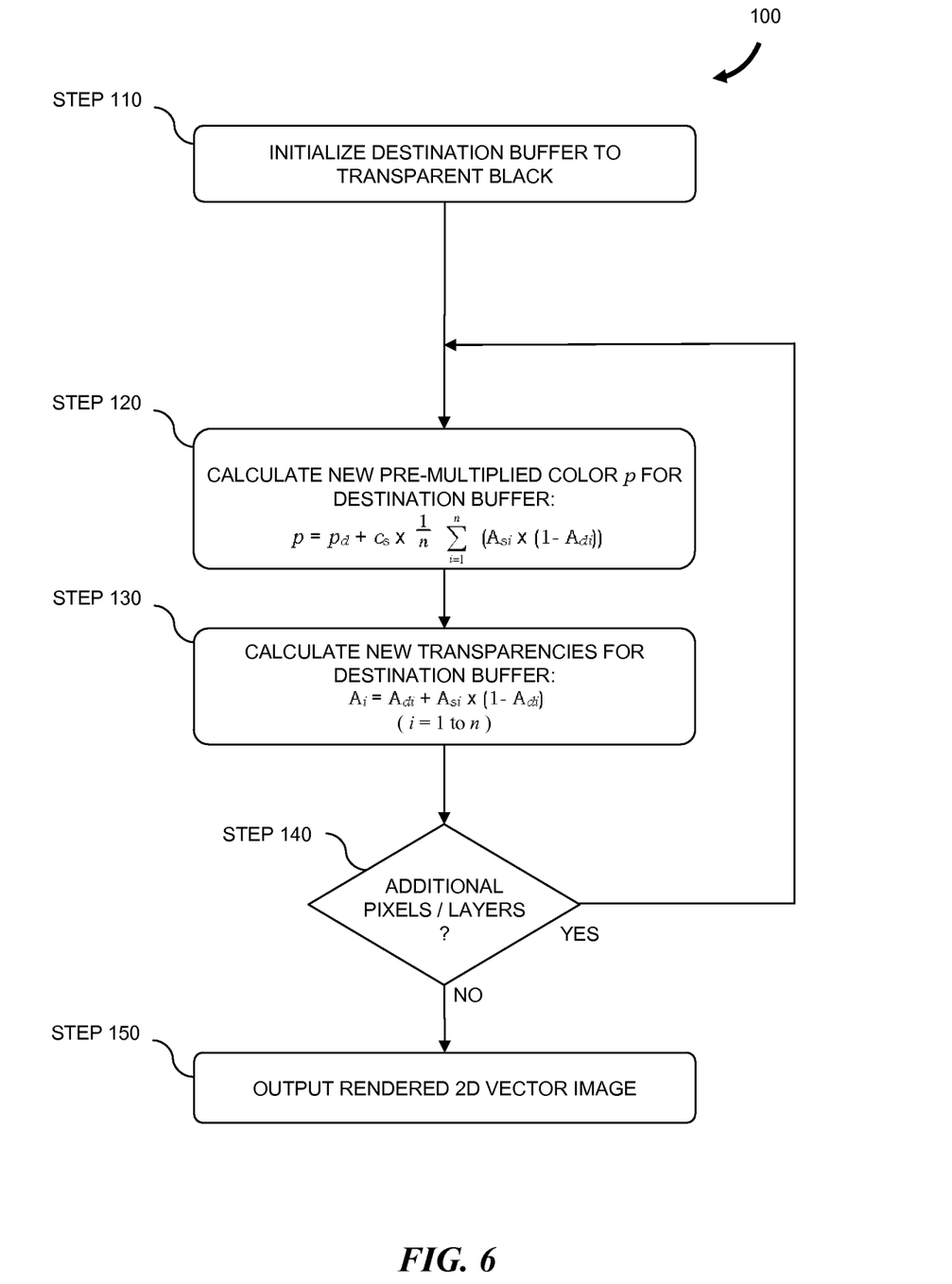
FIG. 6 is a flow chart representation of an embodiment of a method for rendering an antialiased 2D vector image according to the invention.

FIG. 6 is a flow chart representation of a method 100 for rendering an antialiased 2D vector image according to an embodiment of the invention. The destination buffer (i.e., target buffer) is initialized (step 110) to transparent black. Color is added to the destination buffer after the color is pre-multiplied with the alpha value based on the coverage mask of a polygon at the pixel 10, the alpha value of the fill material of the polygon, and the alpha values stored in the destination buffer as described in more detail below.

The composition calculations for determining the pre-multiplied color values $p_s$ and $p_d$ for the source and destination, respectively, are given by $$p_s = c_s \times \alpha_s \text{ and} \quad [1]$$

$$p_d = c_d \times \alpha_d \quad [2]$$

where $c_s$ and $c_d$ are the source and destination colors, respectively, and $\alpha_s$ and $\alpha_d$ are the source transparency and destination transparency, respectively. Thus the new pre-multiplied color p is given by $$p = c \times \alpha \quad [3]$$

where c is the new color and $\alpha$ is the new transparency.

Normal alpha blending based on transparency $\alpha$ and pre-multiplied color p is given by $$p = p_s + p_d \times (1 - \alpha_s) \text{ and} \quad [4]$$

$$\alpha = \alpha_s + \alpha_d \times (1 - \alpha_s). \quad [5]$$

In contrast, the composite operation according to the invention is based on the reverse of the order used with conventional alpha blending. In other words, the source is added "behind" the destination. Consequently, the new pre-multiplied color p and new transparency $\alpha$ according to the invention are given by $$p = p_d + p_s \times (1 - \alpha_d) \text{ and} \quad [6]$$

$$\alpha = \alpha_d + \alpha_s \times (1 - \alpha_d). \quad [7]$$

Figure 7:
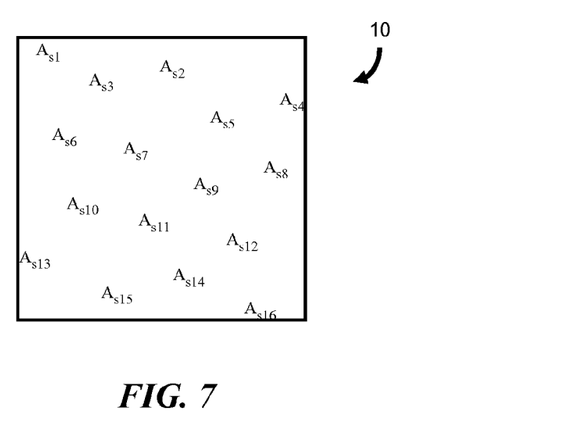
FIG. 7 is graphically illustrates how source transparencies are be indexed according to location within a pixel in accordance with an embodiment of the invention.

A pre-multiplied color value is used for each destination pixel; however, a single pre-multiplied source color $p_s$ is not used. Instead, spatially-distributed source transparencies $\alpha_s$ are used. Using equation [1], the new pre-multiplied color p given by equation [6] can be expressed as $$p = p_d + c_s \times \alpha_s \times (1 - \alpha_d) \quad [8]$$

where the source transparency $\alpha_s$ varies according to the sample position in the pixel. Thus for a pixel having 16 samples there are 16 transparencies $\alpha_s$. More specifically, the source transparency $\alpha_s$, destination transparency $\alpha_d$ and new destination transparency $\alpha$ each have 16 values and are denoted hereafter by $A_{si}$, $A_{di}$ and $A_i$, respectively, where i=1 to 16. FIG. 7 graphically depicts how the source transparencies $A_{si}$ can be indexed according to location within a pixel 10. The destination transparencies $A_{di}$ and the new destination transparencies $A_i$ are similarly located within their pixels. Source transparencies $A_{si}$ are defined using a source coverage mask. The source coverage mask includes 16 1-bit samples each having a value $m_i$ of 1 or 0 according to the polygon data.

Figure 8A:
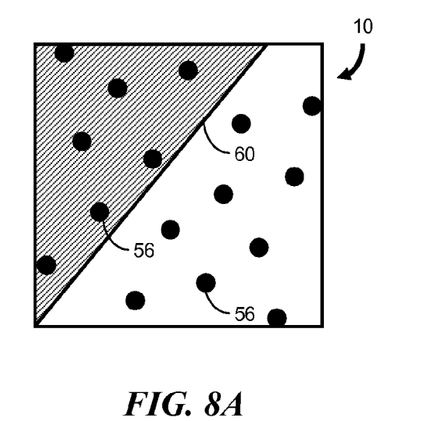
FIG. 8A shows a pixel partially covered by a source solid-fill polygon and FIG. 8B shows the corresponding 1-bit values for a source coverage mask.
Figure 8B:
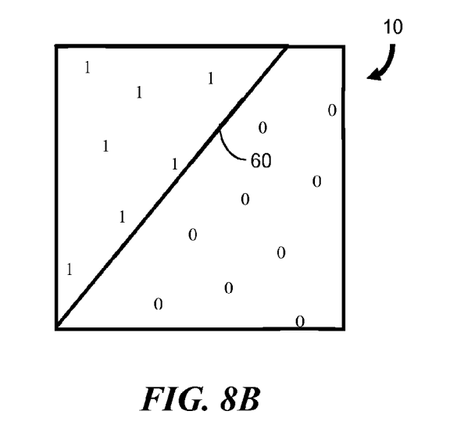

FIG. 8B shows an example of the 1-bit values for a source solid-fill polygon to the left of an edge 60 in the pixel 10 of FIG. 8A. The source transparencies $A_{si}$ are given by $$A_{si} = \alpha_s \times m_i. \quad [9]$$

The new pre-multiplied color p for a pixel is therefore given by $$p = \frac{1}{16} \sum_{i=1}^{16} (p_d + c_s \times A_{si} \times (1 - A_{di})). \quad [10]$$

According to the method there is only one pre-multiplied destination color value $p_d$ and one color source color value $c_s$ for the pixel thus equation [10] is calculated (step 120 of FIG. 6) as $$p = p_d + c_s \times \frac{1}{16} \sum_{i=1}^{16} (A_{si} \times (1 - A_{di})) \quad [11]$$

and the new transparency $A_i$ for each sample in the pixel is calculated (step 130 of FIG. 6) as $$A_i = A_{di} + A_{si} \times (1 - A_{di}). \quad [12]$$

Referring to FIG. 6, the method 100 returns (at step 140) to repeat the calculations of equations [11] and [12] (i.e., steps 120 and 130) for additional pixels and layers. Once all pixels and layers have been processed, the 2D vector image is provided (step 150) to a display device.

The following pseudo code provides one example of the calculation of the pre-multiplied result color p:

```
sumAlpha = 0
for i = 0 to 15
{
    sumAlpha = sumAlpha + srcMask[i] * (1 − dstMask[i])
    dstMask[i] = dstMask[i] + srcMask[i] * (1 − dstMask[i])
}
dstCol = dstCol + srcCol * sumAlpha / 16
``` where sumalpha is the transparency value that is used for blending the source color to the destination color, srcMask[ ] is an array of 16 transparency values, each value being either 0 or the source transparency value (depending on the corresponding bit in the coverage mask generated from the polygon data), dstMask[ ] is an array of 16 transparency values stored in the destination buffer for each pixel, srcCol is the color value of the fill material at the given pixel, and dstCol is the color value stored in the destination buffer for each pixel. dstMask[ ] and dstCol are initialized to zero before the image is rendered.

The processing requirements for the composition calculations are significant if the calculations are repeated fully for each pixel; however, there are special cases that can be addressed to reduce the processing load. In one case the transparency values $A_{di}$ in the destination buffer are equal to one for all samples in a pixel. In this instance equations [11] and [12] simplify to $p = p_d$ and $A_{di} = 1$, i.e., the pre-multiplied color value p and destination transparency $A_{di}$ are unchanged. Stated otherwise, if the destination transparencies $A_i$ are saturated, the destination buffer no longer requires modification for that pixel.

A second special case occurs when the transparencies $A_{di}$ in the destination buffer are equal to zero for all samples in a pixel. Thus the new pre-multiplied color from equation [11] is given by $$p = p_d + c_s \times \frac{1}{16} \sum_{i=1}^{16} A_{si}.$$  [13]

The summation can be performed efficiently as the source transparency values $A_{si}$ are determined from the values mi of the source coverage mask and a single transparency value for the source pixel. Moreover, the pre-multiplied destination color $p_d$ is zero because the destination transparencies $A_{di}$ are all equal to zero. Thus equation [13] can be expressed as $$p = p_s \times \frac{1}{16} \sum_{i=1}^{16} m_i.$$  [14]

Therefore, from equation [14] for a pixel in the interior of a polygon where all 16 bits in the source coverage mask for the pixel have a value of one, the new pre-multiplied color p equals the pre-multiplied source color $p_s$ and, from equation [12], the new transparency $A_i$ for each sample in the pixel is the same as the respective source transparency $A_{si}$ for the sample. Stated otherwise, if the destination transparencies $A_{di}$ are zero for all samples, nothing has been written to the pixel yet. Consequently, there is no contribution from the destination pixel and the source values are written as the pixel values.

Process Optimizations for Degenerate Cases

The rasterization order is from front to back thus the method of the invention permits rasterization of images such that the depth complexity is reduced to a single layer if only solid fill polygons are used. As a result, significant savings in the data bandwidth are realized, especially with respect to images for which substantial overdraw is otherwise required. Preferably, rasterization is performed so that longer spans of pixels with fully saturated destination transparencies $A_i$ can be skipped or compactly represented, resulting in decreased pixel processing. For complex fills such as gradients and patterns, performance is improved as there is no need to calculate these fills for pixels that are obstructed by polygons towards the front.

Process Optimizations Based on Compression of Alpha Values

A buffer can be used to encode pixels according to the special cases described above. More specifically, the buffer provides two bits per pixel to "flag" the special case. The flags can be pre-fetched for each polygon span during rasterization and, before processing the pixels in the span, checked to determine whether the destination pixel is full or empty. If the destination pixel is full, nothing is written for the pixel. Conversely, if the destination pixel is empty, the values for the source pixel are written to the destination pixel. In either case, there is no need to modify the transparencies $A_i$ in the destination buffer. When the destination buffer is cleared, the values for the two bits are set to indicate that the destination transparency $A_i$ is set to zero for all samples in the pixels. When the filling process saturates the transparencies $A_i$ of a pixel to one (as often happens with solid fills), there is no need to write the transparencies $A_i$ and the flag bits are changed accordingly to indicate this situation.

To store the transparency values for all 16 samples in a pixel, 128 bits are used. Thus the memory requirements for a 32-bit frame buffer are increased by 400%. Often the number of different transparency values is small relative to the number of samples. For example, when an edge crosses a pixel so that only half of the samples are covered by a solid-fill polygon, half of the transparency values are zero and the remaining transparency values are one. In another example, when all the transparency values for the samples are different, their effect is averaged and the contribution from an individual sample is small. Compression can be utilized to halve the memory and bandwidth requirements, to store accurate transparency values for instances when no more than four transparency values exist for all 16 samples, and to use quantization when there are more than four transparency values for the pixel.

Figure 9:
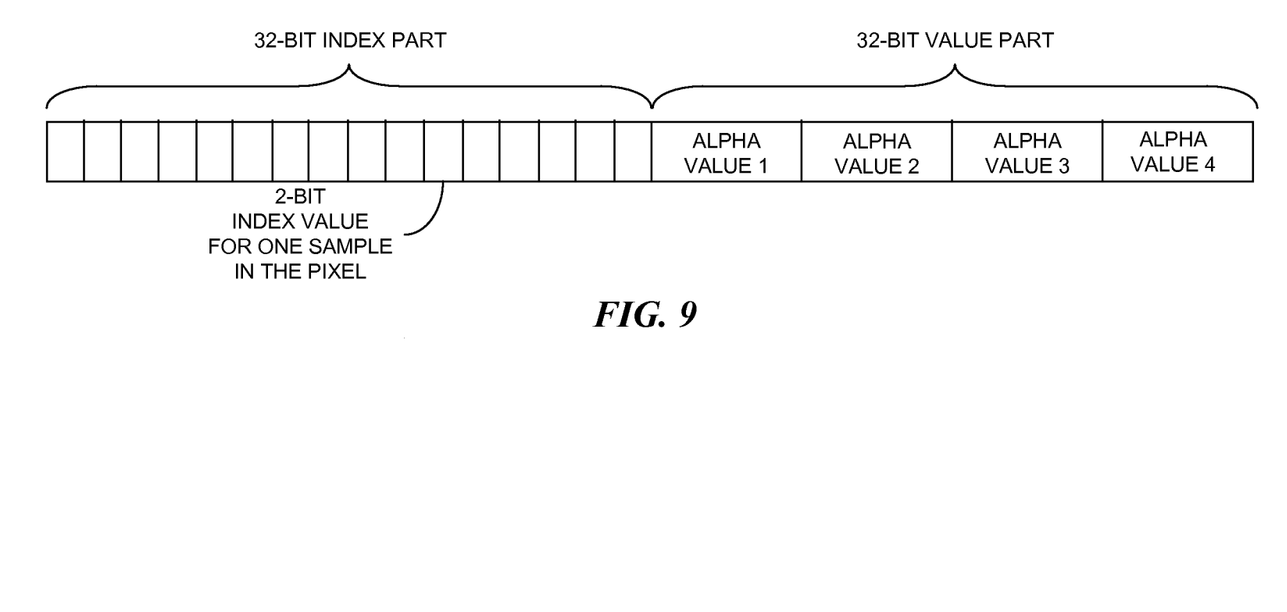
FIG. 9 is a graphical representation of a bit pattern using a palette compression technique for saving transparency values for each of 16 sample positions in a pixel.

A palette compression technique is used to save up to four possible transparency values accurately. The 64-bit sample buffer is split into an index part and a value part as shown in FIG. 9. The index part includes 32 bits for defining a 2-bit index value for each of the 16 samples. The value part includes 32 bits for defining a palette of four 8-bit transparency values. To retrieve a transparency for a particular sample, the corresponding 2-bit value from the index part is fetched and then the corresponding 8-bits in the value part mapped to that index are extracted.

To have more than four transparencies for a pixel, the edges of more than two alpha blended polygons with different transparency values need to cross the pixel. Typically there are not many pixels that satisfy this condition. Due to the limited number of such pixels, compression of the associated data produces negligible artifacts. Quantized compression can be utilized for these relatively rare cases of pixels having more than four transparency values. The 8-bit transparency values can be quantized in only four bits. Alternatively, fewer bits can be used per sample. For example, if three bits are used per sample, the 16 bits "gained" are used to store an 8-bit minimum transparency value and an 8-bit maximum transparency value. In most instances, the range of transparency values for a pixel is small, therefore the three bit technique generally results in a higher accuracy than the four bit technique. The three bit technique has a higher processing load than the four bit technique as the minimum and maximum of the data are determined and the transparency data are scaled to an arbitrary range.

The buffer used to encode pixels according to the special cases described above includes two bits per pixel where the value of the two bits is used to represent one of three possible conditions for the pixel in the destination buffer: (1) all transparencies for the samples are equal to one; (2) all transparencies for the samples are equal to zero; and (3) all other conditions. In one embodiment, the value of the two bits is used to indicate one of four conditions: (1) transparencies for all samples are equal to one; (2) transparencies for all samples are equal to zero; (3) transparency values are palette compressed; and (4) transparency values are quantized.

The algorithm may require the use of temporary buffers for blending, therefore it is sometimes preferable to compress the image data for buffering. In some instances, it is also possible to perform blending operations directly from the compressed buffered data without first decompressing the data. As the two-bit tag array includes information about each pixel in the image, the compression algorithm can scan the image and store the 32-bit color value for only the pixels that are not empty and the 64-bit compressed transparency data for those pixels that have transparency samples. The scanning order for this process is not critical as long as the order is the same for both compression and decompression. The two-bit tag array is stored entirely; however, entries for color and transparency values that do not contain valid data can be ignored. It is possible to implement these operations in place, that is, the compacted data can start from the same memory location as the original data as long as the decompression is done in the reverse order. In this manner it is possible to use a continuous memory area for the layered rendering process required by the blend operations, as after creating one layer it is possible to compact the layer and to start the next layer from the first free memory index after the compacted data.

Compression techniques other than those described above can be employed to improve performance. For example, an additional condition occurs when the samples for a pixel have the same transparency value and the value is greater than zero but less than one. An additional bit (i.e., a third bit) can be used to enable identification of this additional condition and the other four conditions; however, other data arrangements can be utilized to permit a better memory access with a suitable block-based caching operation.

The following pseudo code provides one example implementation of the some of the optimization techniques described above.

```
if storageMode == FULL
{
  // do nothing
}
else if storageMode == EMPTY
{
  sumAlpha = 0
  fullMask = TRUE
  for i = 0 to 15
  {
    sumAlpha = sumAlpha + srcMask[i]
    dstMask[i] = srcMask[i]
    if dstMask[i] < 1
      fullMask = FALSE
  }
  dstCol = srcCol * sumAlpha / 16
  if fullMask == TRUE
    storageMode = FULL
  else
  {
    compressPalette(dstMask)
    storageMode = PALETTE
  }
}
else
{
  if storageMode == PALETTE
    decompressPalette(dstMask)
  else
    decompressQuantized(dstMask)
  sumAlpha = 0
  fullMask = TRUE
  for i = 0 to 15
  {
    sumAlpha = sumAlpha + srcMask[i] * (1 - dstMask[i])
    dstMask[i] = dstMask[i] + srcMask[i] * (1 - dstMask[i])
    if dstMask[i] != 1
      fullMask = FALSE
  }
  dstCol = dstCol + srcCol * sumAlpha / 16
  if fullMask == TRUE
    storageMode = FULL
  else
  {
    if countAlphaValues(dstMask) <= 4
    {
      compressPalette(dstMaskCompressed)
      storageMode = PALETTE
    }
    else
    {
      compressQuantized(dstMaskCompressed)
      storageMode = QUANTIZED
    }
  }
}
``` where storageMode is a two-bit value that describes the one of four possible conditions for a pixel in the destination buffer. Possible values for storageMode are EMPTY, FULL, PALETTE and QUANTIZED. storageMode is initialized to EMPTY for all pixels in the destination buffer before rendering the image. fullMask is a Boolean value for tracking if the destination is full and can have a value of TRUE or FALSE. The functions compresspalette( ) and decompresspalette( ) are used for compressing and decompressing, respectively, transparency values that use the palette format. The functions compressQuantized( ) and decompressQuantized( ) are used for compressing and decompressing, respectively, transparency values that use the quantized format. The compression and decompression functions operate between the parameter array and a 64-bit slot in memory assigned to the pixel being processed. The function countAlphaValues( ) is used to determine the amount of individual transparency values of a pixel.

Application of Filter Kernels

The method of the invention as described above uses box filtering in which all data for a pixel are taken from samples within the pixel. The invention also contemplates the use of other filter kernels. For example, each sample in the pixel can have an associated weighting factor. Moreover, filter kernels can be larger than a pixel.

Figure 10:
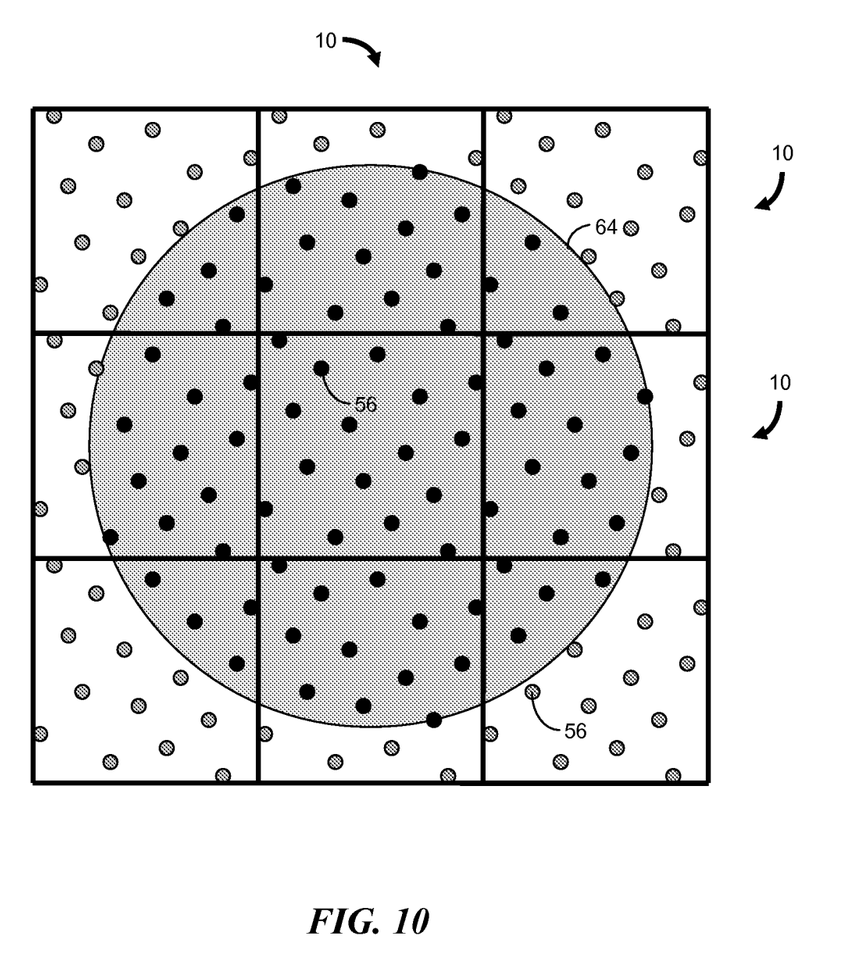
FIG. 10 illustrates a circular filter kernel used in an embodiment of a method for rendering an antialiased 2D vector image according to the invention.

Filter kernels that are larger than a pixel generally produce more levels of antialiasing. FIG. 10 shows a circular filter kernel 64 applied to a pixel 10 centered in the illustrated group of nine pixels 10. The filter utilizes 78 samples 56, including the 16 samples 56 from the center pixel 10 and a portion of the samples 56 in the neighboring pixels 10. The color value is accumulated for the center pixel by adding scaled source colors until the transparencies are fully saturated. Thus it is possible to accumulate the color calculated for one pixel 10 to the neighboring pixels 10 if a suitable weighting distribution is used when calculating the transparencies. In one embodiment the filter has a Gaussian weighting distribution that is symmetric about the midpoint of the center pixel. Gaussian weighting is desirable in many instances such as for a moving object in order to avoid flickering of the object.

When calculating the color for a single pixel 10, data from the eight neighboring pixels 10 are also included. More specifically, when the coverage of a polygon is calculated for the single pixel 10, the coverage also contributes to the eight neighboring pixels 10. Consequently, the weights from nine different filter kernels are used with the current coverage masks and the resulting colors are added to the nine pixels 10. Thus the pre-multiplied color for each of the pixels 10 is given by $$p = p_d + c_s \times \frac{1}{16} \sum_{i=1}^{16} (A_{si} \times w_i \times (1 - A_{di})) \qquad [15]$$

where $\omega_i$ is the weight table for the respective pixel 10. Although the filtering represents an increased processing load, the color data in the neighborhood of a pixel 10 is typically cached, therefore, when scanning from left to right, the three color values to the right are read and subsequently accumulated during horizontal procession until the accumulated color values are written as they "exit" from the left.

Increased Color Accuracy

Figure 11A:
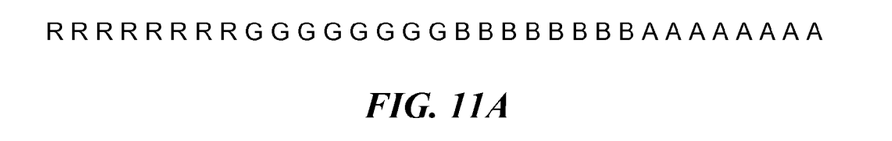
FIG. 11A shows a standard RGBA bit arrangement and FIG. 11B to FIG. 11E show alternative bit arrangements that can be utilized to store color components according to different embodiments of the method of the invention.
Figure 11B:
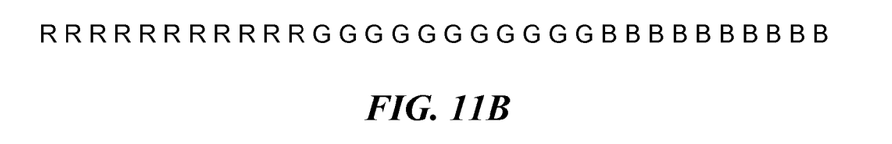
Figure 11C:
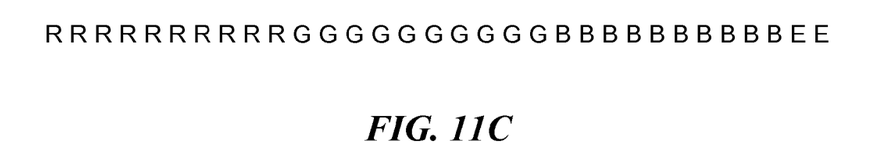
Figure 11D:
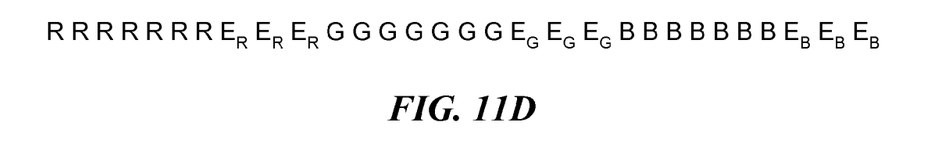

The rendering order is different from the typical back to front order therefore alpha blending with low transparency values can produce different results when rendering from front to back. Neither of the results is exact as low order bits are "rounded off" and quantization artifacts are created for certain configurations for both cases. To avoid these artifacts, 16 bits can be used for each color component during accumulation instead of the default eight bits, resulting in a doubling of bandwidth and memory for the color buffer. To avoid doubling the bandwidth and memory, additional color bits can replace the "unused" eight bits reserved for the transparency value and the bit arrangement can be modified. (The transparency value is stored in a different buffer and processed separately, thereby rendering the eight alpha bits as unused.) The color bits are typically organized according to an "RGBA" sequence as shown in FIG. 11A where each of the four components R, G, B and A has eight bits. The "A" portion is unused, therefore more than eight bits but less than 16 bits can be used for each of the other three components. The bits can be arranged in a variety of ways. In a fixed point example as shown in FIG. 11B, 11 bits are used for the red and green components, and only 10 bits are used for the blue component due to the decreased sensitivity of the human eye to blue. Alternatively, the color value is stored in a floating point format where the exponent is shared among the color components. For example, 10 bits are used for the mantissa of each component and two bits are used for the shared exponent (E), as shown in FIG. 11C where R, G and B represent bits used for the mantissa of the red, green and blue components, respectively. In another floating point format, a seven bit mantissa and a three bit exponent (designated as $E_R$, $E_G$ and $E_B$ for the red, green and blue exponent bits, respectively) are used for each of the three color components as shown in FIG. 11D.

Figure 11E:
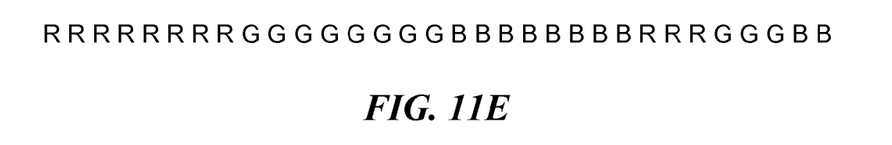

As the target image is typically 32 bits per pixel with eight bits per component image, the color data is converted to the correct format when the image composition is completed. A final processing pass is required for the buffer clear operation (i.e., the last operation with the reversed rendering order). If the destination image uses transparency, the transparency values are converted from the sample-based formatting to the correct image format. It is possible to incorporate color format conversion in this final stage, thus reducing the total amount of buffer reads required in the conversion. As the color data format conversion can consume significant bandwidth, it can be preferable in some applications to defer the conversion until the image is "consumed" so that conversion only occurs for data that are to be read. In embodiments where the alpha channel of the destination image is not used, a fixed point format can be employed in which the positions of the eight most significant bits for each component match the positions of the bits when stored in a normal 32-bit RGBA format, but the least significant two or three bits are in the transparency value position. An example of this arrangement according to bit significance is shown in FIG. 11E where the bits shown in FIG. 11B are rearranged accordingly.

Although described herein predominantly as a method, embodiments of the described invention may be implemented in hardware (digital or analog), software (program code), or combinations thereof. Program code implementations of the present invention can be embodied as computer-executable instructions on or in one or more articles of manufacture, or in or on computer-readable medium. A computer or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, C#, Pascal, JAVA, BASIC, and Visual Basic.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, HDL (hardware description language) code (which can be used, in alternative embodiments to produce or manufacture an article of manufacture— e.g., an ASIC—that operates as described herein), interpretive code, executable code, or combinations thereof.

While the invention has been shown and described with reference to specific preferred embodiments, it should be understood by those skilled in the art that various changes in form and detail may be made therein without departing from the spirit and scope of the invention as defined by the following claims. For example, although described above for alpha blending, other blend functions can also be utilized if the image can be constructed in sequences that do not contain any special blend functions so that temporary images are blended together. The images can be converted to a traditional 32-bit image data format, or the transparency sample information can be retained with them, allowing the composition to use higher quality antialiasing. If the sequences need to be composed in back to front order, it may still be possible to create the sequences in front to back order. Thus information about fully opaque pixels can be maintained throughout the process so that no data is generated for areas obstructed by the layer in front.

What is claimed is:

1. A method of rendering an image, the method comprising:
   determining a plurality of transparencies of a destination pixel at a plurality of samples in the destination pixel;
   determining a plurality of transparencies of a source pixel at a plurality of samples in the source pixel based on a source coverage mask that indicates the samples of the source pixel which are covered by a polygon and based on a single transparency value for the source pixel, each of the transparencies of the source pixel being equal to the single transparency value for the source pixel multiplied by a respective one of a plurality of bits in the source coverage mask, the destination pixel being in front of the source pixel; and
   determining, by a graphics processor, a new pre-multiplied color of the destination pixel based on the transparencies of the destination pixel, the transparencies of the source pixel, a color of the source pixel and a pre-multiplied color of the destination pixel.

2. The method of claim 1, further comprising determining a plurality of new transparencies of the destination pixel at the samples in the destination pixel based on the transparencies of the source pixel and the transparencies of the destination pixel.

3. The method of claim 1, wherein the determinations are made for a single layer in a two-dimensional vector image, the method further comprising repeating the determinations for another layer in the two-dimensional vector image.

4. The method of claim 1, wherein the source coverage mask comprises a plurality of binary values, each of the binary values corresponding to a respective one of the plurality of samples in the source pixel, wherein determining the plurality of transparencies of the source pixel comprises determining the transparencies of source pixel based on the plurality of binary values in the source coverage mask and the single transparency value for the source pixel.

5. The method of claim 1, wherein determining the new pre-multiplied color of the destination pixel comprises determining the new pre-multiplied color of the destination pixel to be a pre-multiplied color of the source pixel when each of the transparencies of the destination pixel has a value of zero.

6. The method of claim 2, further comprising storing at least one of the new transparencies of the destination pixel in a palette compression format.

7. The method of claim 2, further comprising storing at least one of the new transparencies of the destination pixel in a quantized compression format.

8. A method of rendering an image, the method comprising:
   determining a plurality of destination transparencies $A_{di}$ at a number n of samples in a destination pixel;
   determining a plurality of source transparencies $A_{si}$ at the number n of samples in a source pixel, the source pixel being behind the destination pixel; and
   calculating, by a graphics processor, a new pre-multiplied color p for the destination pixel based on a pre-multiplied destination color $p_d$, a source color $c_s$, the plurality of destination transparencies $A_{di}$ of the n samples in the destination pixel and the plurality of source transparencies $A_{si}$ of the n samples in the source pixel according to the following equation:

$$p = p_d + c_s \times \frac{1}{n} \sum_{i=1}^{n} (A_{si} \times (1 - A_{di}))$$

where n is an integer greater than one.

9. The method of claim 8, further comprising calculating a plurality of new transparency values $A_i$ for the samples in the destination pixel based on the destination transparencies $A_{di}$ and the source transparencies $A_{si}$, according to the following equation:

$$A_i = A_{di} + A_{si} \times (1 - A_{di})$$

where i =1 to n and n is an integer greater than one.

10. The method of claim 8, wherein the source transparencies are based on a plurality of values in a coverage mask for the source pixel.

11. The method of claim 8, wherein the determinations and calculations are made for a single layer in a two-dimensional vector image, the method further comprising repeating the determinations and calculations for another layer in the two-dimensional vector image.

12. A graphics processor for generating antialiased two-dimensional vector images comprising:
   a source buffer storing, for a plurality of source pixels, a color for each of the source pixels and a plurality of transparencies for each of the source pixels, wherein for each of the source pixels, each of the transparencies for the respective source pixel is associated with a respective one of a plurality of samples of the respective source pixel, wherein the plurality of transparencies for each of the source pixels are determined based on a source coverage mask that indicates the samples of the respective source pixel which are covered by a polygon and based on a single transparency value for the respective source pixel, and wherein each of the transparencies of the source pixel is equal to the single transparency value for the source pixel multiplied by a respective one of a plurality of bits in the source coverage mask;
   a destination buffer storing, for a plurality of destination pixels, a color for each of the destination pixels and a plurality of transparencies for each of the destination pixels, wherein for each of the destination pixels, each of the transparencies for the respective destination pixel is associated with a respective one of a plurality of samples of the respective destination pixel, each of the destination pixels being in front of a respective one of the source pixels; and
   a composition module in communication with the destination buffer and the source buffer, the composition module generating a new pre-multiplied color for each of the destination pixels based on the transparencies of the respective destination pixel, the transparencies of a respective one of the source pixels, a color of the respective one of the source pixels and a pre-multiplied color of the respective destination pixel.

13. The graphics processor of claim 12, further comprising a display screen in communication with the composition module and the destination buffer to display the antialiased two-dimensional vector images.

14. The graphics processor of claim 12, further comprising a pixel encode buffer having a plurality of pixels, each of the pixels having at least two bits to indicate whether all of the transparencies of a respective one of the destination pixels have a value of one and whether all of the transparencies of the respective one of the destination pixels have a value of zero.

15. The graphics processor of claim 14, wherein the at least two bits further indicates whether the transparencies of the respective one of the destination pixels are palette compressed.

16. The graphics processor of claim 14, wherein the at least two bits further indicates whether the transparencies of the respective one of the destination pixels are quantized compressed.

17. The graphics processor of claim 12, the composition module generating, for each of the destination pixels, a new transparency at each of the samples of the respective destination pixel based on the transparencies of a respective one of the source pixels and the transparencies of the respective destination pixel.

18. A non-transitory computer readable medium for rendering an image, the computer readable medium comprising computer executable instructions to cause one or more processors to:
   determine a plurality of transparencies of a destination pixel at a plurality of samples in the destination pixel;
   determine a plurality of transparencies of a source pixel at a plurality of samples in the source pixel based on a source coverage mask that indicates the samples of the source pixel which are covered by a polygon and based on a single transparency value for the source pixel, each of the transparencies of the source pixel being equal to the single transparency value for the source pixel multiplied by a respective one of a plurality of bits in the source coverage mask, the destination pixel being in front of the source pixel; and determine a new pre-multiplied color of the destination pixel based on the transparencies of the destination pixel, the transparencies of the source pixel, a color of the source pixel and a pre-multiplied color of the destination pixel.

19. A graphics processor for generating antialiased two-dimensional vector images comprising:
a destination buffer storing, for a plurality of destination pixels, a pre-multiplied destination color $p_d$ for each of the destination pixels and a plurality of transparencies $A_{di}$ for each of the destination pixels, wherein for each of the destination pixels, each of the transparencies for the respective destination pixel is associated with a respective one of a plurality of samples of the respective destination pixel;
a source buffer storing, for a plurality of source pixels, a color $c_s$ for each of the source pixels and a plurality of transparencies $A_{si}$ for each of the source pixels, wherein for each of the source pixels, each of the transparencies for the respective source pixel is associated with a respective one of a plurality of samples of the respective source pixel, each of the source pixels being behind a respective one of the destination pixels; and
a composition module in communication with the destination buffer and the source buffer, the composition module generating a new pre-multiplied color p for each of the destination pixels based on the transparencies $A_{di}$ of the respective destination pixel, the transparencies $A_{si}$ of a respective one of the source pixels, a color $c_s$ of the respective one of the source pixels and the pre-multiplied color $p_d$ of the respective destination pixel according to the following equation:

$$p = p_d + c_s \times \frac{1}{n} \sum_{i=1}^{n} (A_{si} \times (1 - A_{di}))$$

where n is an integer greater than one that represents a number of samples for each of the source pixels and a number of samples for each of the destination pixels.

20. The graphics processor of claim 19, the composition module generating, for each of the destination pixels, a plurality of new transparency values $A_i$ at each of the samples of the respective destination pixel based on the transparencies $A_{si}$ of a respective one of the source pixels and the transparencies $A_{di}$ of the respective destination pixel according to the following equation:

$$A_i = A_{di} + A_{si} \times (1 - A_{di})$$

where i =1 to n and n is an integer greater than one that represents the number of samples for each of the source pixels and the number of samples for each of the destination pixels.

21. A non-transitory computer readable medium for rendering an image, the computer readable medium comprising computer executable instructions to cause one or more processors to:
determine a plurality of transparencies $A_{di}$ at a number n of samples in a destination pixel;
determine a plurality of transparencies $A_{si}$ at the number n of samples in a source pixel, the source pixel being behind the destination pixel; and
calculate a new pre-multiplied color p for the destination pixel based on a pre-multiplied destination color $p_d$, a source color $c_s$, the destination transparencies $A_{di}$ of the n samples in the destination pixel and the source transparencies $A_{si}$ of the n samples in the source pixel according to the following equation:

$$p = p_d + c_s \times \frac{1}{n} \sum_{i=1}^{n} (A_{si} \times (1 - A_{di}))$$

where n is an integer greater than one.

22. The non-transitory computer readable medium of claim 21, further comprising computer executable instructions to cause the one or more processors to calculate a plurality of new transparency values $A_i$ for the samples in the destination pixel based on the destination transparencies $A_{di}$ and the source transparencies $A_{si}$ according to the following equation:

$$A_i = A_{di} + A_{si} \times (1 - A_{di})$$

where i =1 to n and n is an integer greater than one.

23. A device comprising:
means for determining a plurality of transparencies $A_{di}$ at a number n of samples in a destination pixel;
means for determining a plurality of transparencies $A_{si}$ at the number n of samples in a source pixel, the source pixel being behind the destination pixel; and
means for calculating a new pre-multiplied color p for the destination pixel based on a pre-multiplied destination color $p_d$, a source color $c_s$, the destination transparencies $A_{di}$ and the source transparencies $A_{si}$ according to the following equation:

$$p = p_d + c_s \times \frac{1}{n} \sum_{i=1}^{n} (A_{si} \times (1 - A_{di}))$$

where n is an integer greater than one.

24. The device of claim 23, further comprising means for calculating a plurality of new transparency values A, for the samples in the destination pixel based on the destination transparencies $A_{di}$ and the source transparencies $A_{si}$ according to the following equation:

$$A_i = A_{di} + A_{si} \times (1 - A_{di})$$

where i =1 to n and n is an integer greater than one.

25. A device comprising:
means for determining a plurality of transparencies of a destination pixel at a plurality of samples in the destination pixel;
means for determining a plurality of transparencies of a source pixel at a plurality of samples in the source pixel based on a source coverage mask that indicates the samples of the source pixel which are covered by a polygon and based on a single transparency value for the source pixel, each of the transparencies of the source pixel being equal to the single transparency value for the source pixel multiplied by a respective one of a plurality of bits in the source coverage mask, the destination pixel being in front of the source pixel; and
means for determining a new pre-multiplied color of the destination pixel based on the transparencies of the destination pixel, the transparencies of the source pixel, a color of the source pixel and a pre-multiplied color of the destination pixel.

26. The device of claim 25, further comprising means for determining a plurality of new transparencies of the destination pixel at the samples in the destination pixel based on the transparencies of the source pixel and the transparencies of the destination pixel.

* * * * *